Jan. 9, 1968  D. G. VAN ORNUM  3,363,140
HIGH-POWER RADIATION SOURCE HAVING A LIGHT
TRANSMISSIVE GAS SUPPLY CHAMBER
Original Filed March 18, 1963  4 Sheets-Sheet 1

INVENTOR.
DELBERT G. VAN ORNUM

BY *Jennings & Carr*

ATTORNEY

Jan. 9, 1968  D. G. VAN ORNUM  3,363,140
HIGH-POWER RADIATION SOURCE HAVING A LIGHT
TRANSMISSIVE GAS SUPPLY CHAMBER
Original Filed March 18, 1963  4 Sheets-Sheet 2

INVENTOR.
DELBERT G. VAN ORNUM
BY *Jamming & Carr*

ATTORNEY

Jan. 9, 1968  D. G. VAN ORNUM  3,363,140
HIGH-POWER RADIATION SOURCE HAVING A LIGHT
TRANSMISSIVE GAS SUPPLY CHAMBER
Original Filed March 18, 1963  4 Sheets-Sheet 3

INVENTOR.
DELBERT G. VAN ORNUM
BY *Gerowitz & Carr*

ATTORNEY

INVENTOR.
DELBERT G. VAN ORNUM

ATTORNEY

United States Patent Office 3,363,140
Patented Jan. 9, 1968

3,363,140
HIGH-POWER RADIATION SOURCE HAVING A LIGHT TRANSMISSIVE GAS SUPPLY CHAMBER
Delbert G. Van Ornum, Newport Beach, Calif., assignor, by mesne assignments, to Giannini Scientific Corporation, Amityville, N.Y., a corporation of Delaware
Continuation of application Ser. No. 265,926, Mar. 18, 1963. This application Dec. 1, 1966, Ser. No. 599,342
11 Claims. (Cl. 315—111)

This application is a continuation of patent application Ser. No. 265,926, filed Mar. 18, 1963, for High-Power Radiation Source, now abandoned.

This invention relates to a high-power radiation source, and more particularly to a light source of the type in which gas is passed continuously through an arc chamber. The invention further relates to novel methods of generating and filtering light and of achieving photochemical effects, and additionally relates to novel light sources of a type in which the envelope is shaped as an ellipsoidal reflector.

Light sources having double windows or envelopes have previously been proposed by various prior-art workers, such sources being generally of the type in which the gas within the envelopes is static. The uses for such double envelopes have been to maintain a vacuum around an inner envelope, to reduce deterioration of the outer envelope due to ultra-violet radiation, and to reduce convective circulation of the static gas to the vicinity of the outer envelope. The present invention, on the other hand, is primarily concerned with the prevention of deterioration of the envelope, and possible failure of the light source, as the result of contaminants in a dynamic gas system wherein the gas is pumped continuously through the arc envelope at high pressure and velocity.

Other important aspects of the present invention relate to methods and apparatus for passing liquid adjacent the envelope of the light source for purposes including filtering the light to provide desired spectral distributions, treating the liquid to achieve photochemical effects, and cooling the envelope.

Additional aspects of the present invention relate to the provision of improved light sources adapted to generate an extremely intense light at one focal point of an ellipse, and to reflect such light to the other focal point of the ellipse, in combination with means for achieving effective utilization of the light thus reflected to such other focal point.

A primary object of the present invention is to provide an electric-arc light source capable of operating for long periods of time at very high power levels and at high pressures, without danger that the source will explode.

A further object is to provide an apparatus and method for generating light, in which none of the gas which is disposed in the vicinity of the arc contacts the outer envelope or window, and in which the pressure relationships are such that even a failure of the inner envelope will not result in heating of or damage to the outer envelope.

A further object is to provide an electric-arc light source which may be immersed in liquid without danger of thermal shock, in combination with means and methods for circulating liquid around or adjacent the outer envelope to achieve desired results including filtering of the light and irradiation of the liquid.

Another object is to provide a light source of the gas-vortex type, wherein the arc is generated in a chamber defined by an ellipsoidal mirror, the relationships being such that the mirror will reflect light from the arc to a focal point disposed outside of the arc chamber.

These and other objects will become apparent from the following detailed description taken in connection with the accompanying drawings in which.

Figure 2:
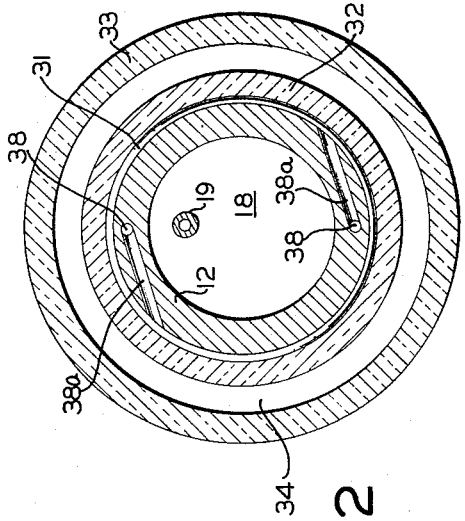
FIGURE 2 is a transverse sectional view along line 2—2 of FIGURE 1.
Figure 1:
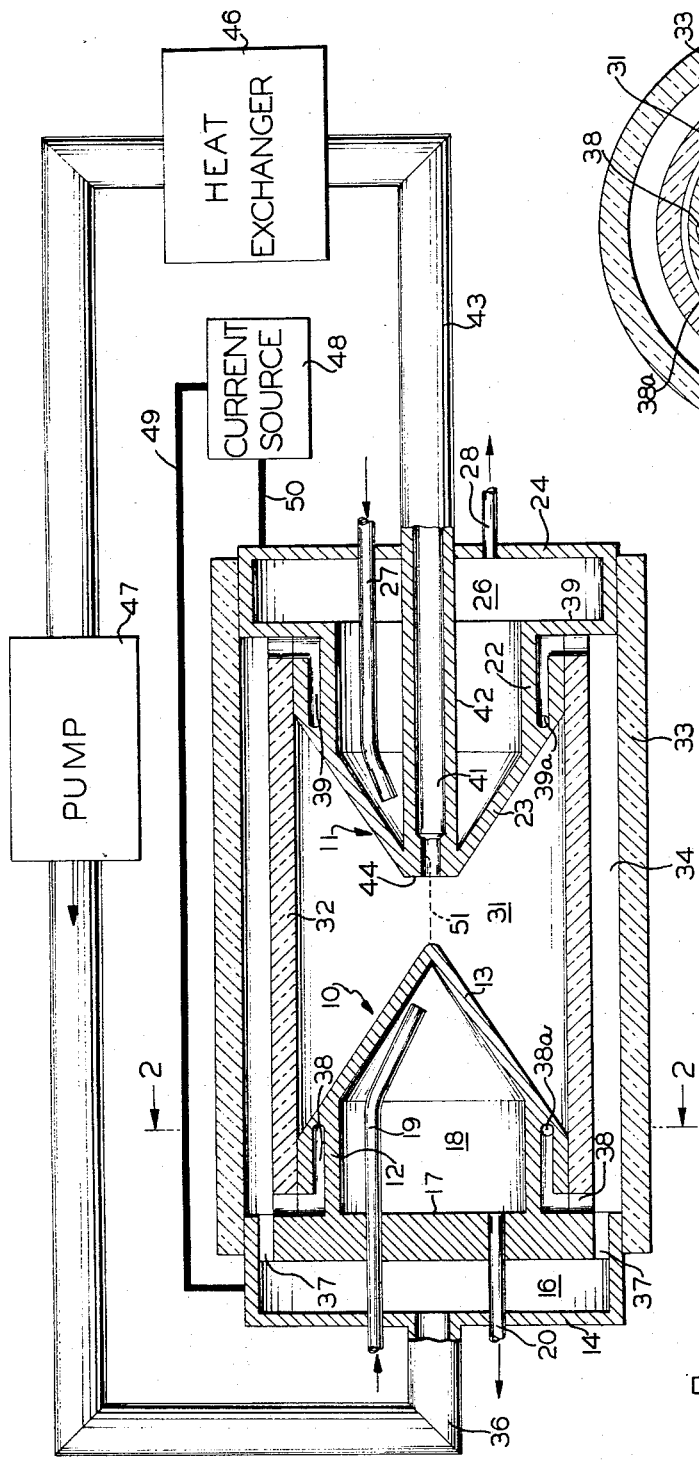
FIGURE 1 is a schematic, longitudinal central sectional view illustrating a light source constructed in accordance with a first embodiment of the invention.
Figure 3:
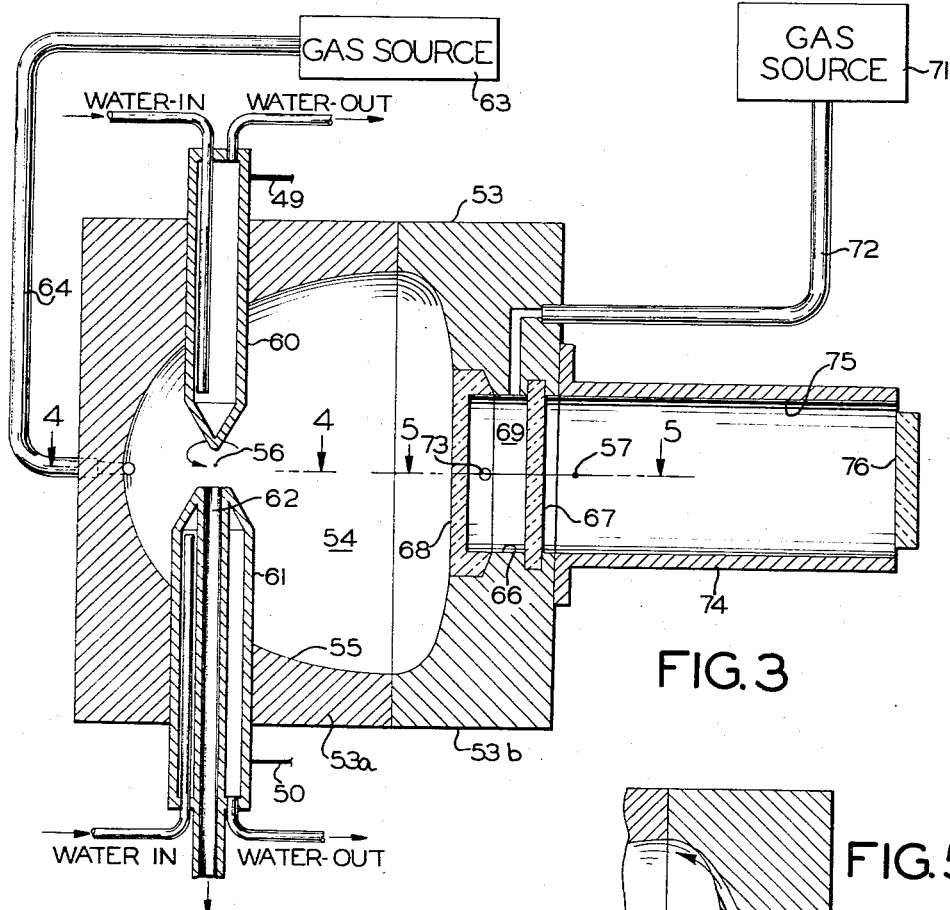
FIGURE 3 is a schematic longitudinal central sectional view illustrating a second embodiment of the invention, in which the arc is generated at one focal point of an ellipsoidal reflector which forms a substantial portion of the envelope of the arc chamber.
Figure 4:
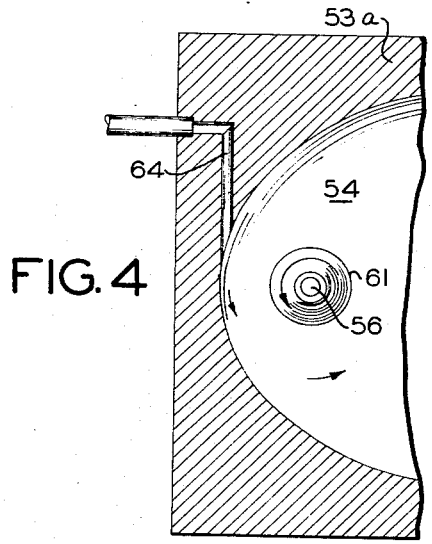
Figure 5:
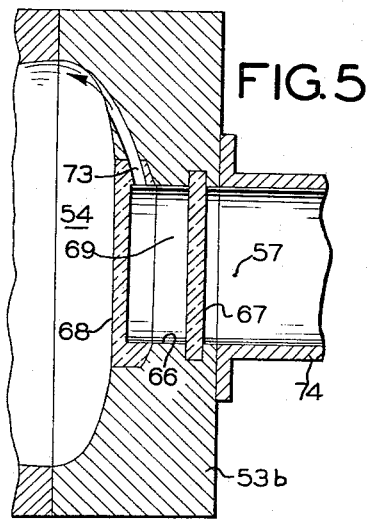
Figure 6:
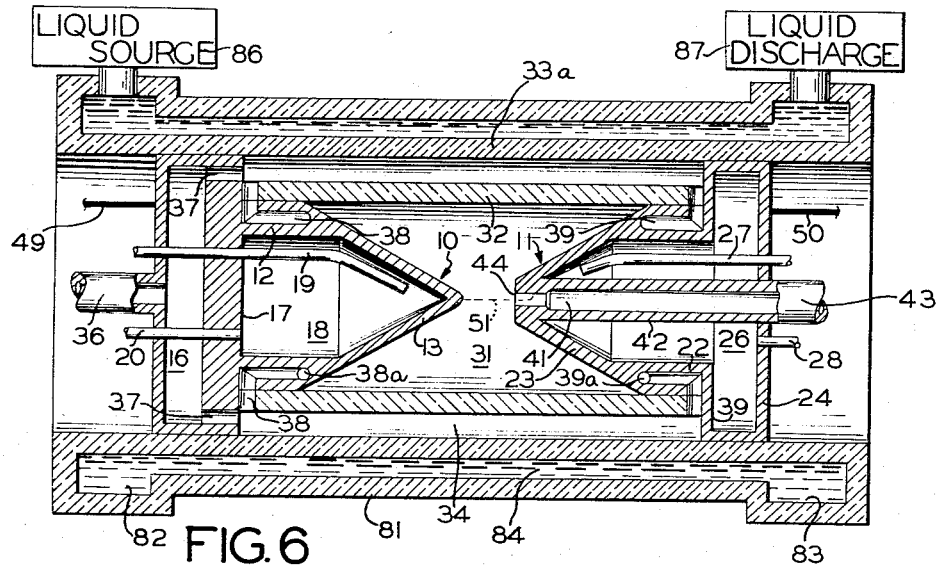
Figure 7:
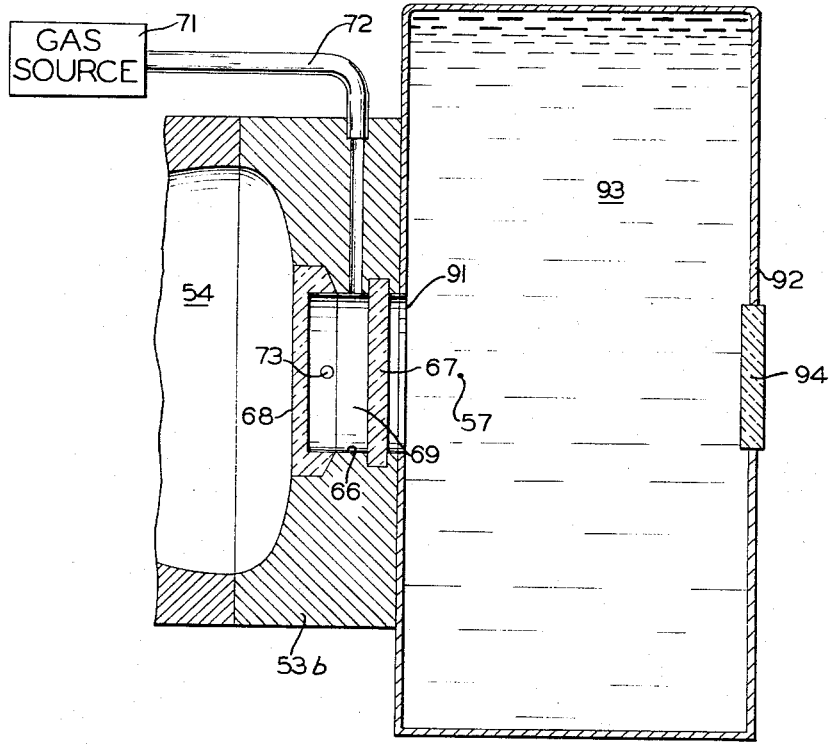
Figure 8:
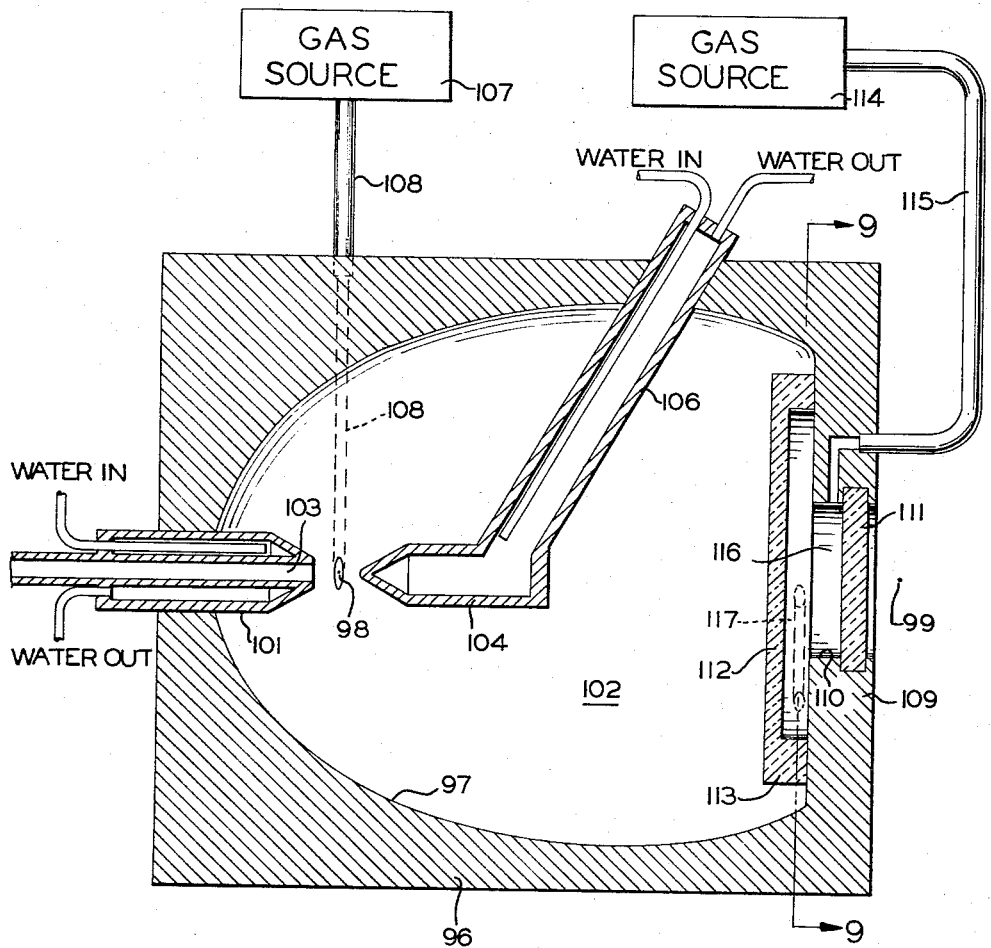
Figure 9:
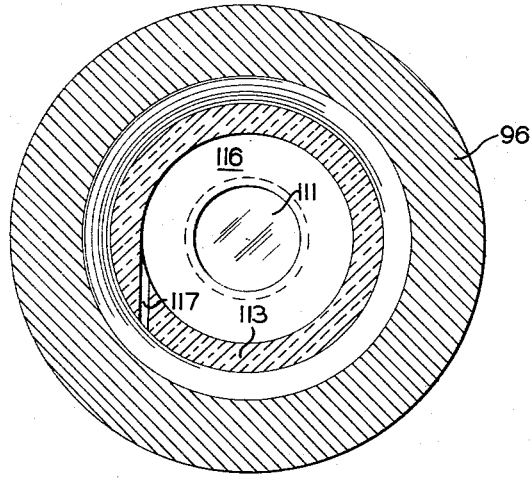

FIGURES 4 and 5 are fragmentary sectional views taken respectively along lines 4—4 and 5—5 of FIGURE 3;

FIGURE 6 is a schematic longitudinal central sectional view illustrating a liquid-containing envelope as mounted around the light source of FIGURES 1–2;

FIGURE 7 is a schematic sectional view illustrating the light source of FIGURES 3–5 as associated with a tank containing a liquid adapted to be treated by the light;

FIGURE 8 is a schematic longitudinal central sectional view showing another embodiment of the invention, in which the electrodes are oriented axially of an ellipsoidal envelope; and FIGURE 9 is a transverse sectional view taken along line 9—9 of FIGURE 8.

Referring first to the embodiment of FIGURES 1 and 2, the apparatus is illustrated schematically to comprise a first electrode 10 and a second electrode 11 disposed in spaced, coaxial relationship in order that an electric arc may be maintained between the adjacent arcing-end portions thereof. The first electrode 10 may comprise a hollow cylindrical body 12 having a conical arcing-end portion 13. The portion of the cylindrical body 12 remote from the end portion 13 is integral with a flange 14, such flange having a header chamber 16 formed therein for distribution of gas as will be described subsequently. A partition wall 17 separates the header chamber 16 from the cooling chamber 18 within the body. Water is passed through such cooling chamber 18 by means of an inlet pipe 19 and a drain pipe 20.

The second electrode 11 has a generally corresponding cylindrical body 22, conical arcing-end portion 23, and flange 24. All of such portions are made hollow so that a single cooling chamber 26 is formed through which water may be circulated by means of an inlet pipe 27 and outlet pipe 28.

Both of the electrodes 10 and 11 may be formed of a suitable conductor such as copper, and may have tungsten inserts (not shown) at the apex portions of the conical ends 13 and 23.

Multiple envelope means are provided to define an arc chamber 31 in which are disposed the arcing portions 13 and 23 of the electrodes 10 and 11. The envelope means are illustrated to comprise an inner tubular envelope 32 and an outer tubular envelope 33, the latter having a substantially larger diameter than the former so that an annulus 34 is formed between the envelopes. The ends of the inner envelope 32 are seated sealingly over the outer cylindrical surfaces of electrode bodies 12 and 22, whereas the end portions of the outer envelope 33 are seated sealingly over the flanges 14 and 24.

The envelopes 32 and 33 are both formed of fused silica, quartz, or the like, it being desirable that both enevelopes be formed of the same transparent refractory substance in order that the inner envelope will absorb certain wave lengths and thereby tend to minimize deterioration of the outer envelope. For purposes of terminology, the inner envelope may be termed the vortex envelope, whereas the outer envelope may be termed the pressure envelope.

There will next be described the gas-flow means by which gas is caused to flow vortically in the vortex chamber 31 enclosed by the inner or vortex envelope 32, and also by which gas is caused to flow in the annulus 34 for cooling and pressurizing purposes.

The gas is introduced through an inlet conduit 36 into the header chamber 16. From chamber 16, the gas flows through a plurality of ports or passages 37 which extend through partition wall 17 and communicate with the annulus 34. There are a substantial number of the ports or passages spaced circumferentially around the end of annulus 34, the number and size of the passages being such that the gas pressure in the annulus is substantially the same as that in header chamber 16.

Gas from annulus 34 is introduced tangentially into the vortex chamber 31 by means of the various passages shown at 38 and 39 in FIGURES 1 and 2. Passages 38 extend radially through or adjacent the ends of the inner, vortex envelope 32, and thence generally longitudinally through the cylindrical portion 12 of the first electrode 10. As best shown in FIGURE 2, the passages 38 have portions 38a which communicate with vortex chamber 31 in a generally tangential manner, the relationship being such that gas introduced through the conical end 13 of electrode 10 flows vortically in such chamber about the axis thereof. A similar relationship is effected relative to the passages 39, including tangential portions 39a thereof, so that gas is also introduced tangentially into chamber 31 through the second electrode 11. The manner of introduction is such that the gas flows aid each other, being counterclockwise in the present illustration and as viewed in FIGURE 2.

The gas discharge from chamber 31 is through the electrode 11, such electrode having a central passage 41 therein. More specifically, the central passage extends through a stem 42 which passes through the cooling chamber 26 and communicates with an outlet conduit 43. The portion of the conical electrode end 23 which is adjacent the inlet of passage 41 is shown as having a radial surface, indicated at 44.

It is a feature of the invention that, during operation of the light source, the pressure in vortex chamber 31 is substantially lower than that in annulus 34. This relationship is achieved by suitably adjusting various parameters, including the number and cross-sectional areas of the various passages. In this connection, it is pointed out that FIGURES 1 and 2 are not necessarily drawn to scale.

The outlet conduit 43 is connected to a suitable heat exchanger which is schematically indicated at 46. A pump 47 draws cooled gas from the heat exchanger and passes it through the conduit 36 back to the manifold or header chamber 16. Thus, the gas is suitably re-circulated. It is to be understood that the pump may be replaced by a gas source, and that conduit 43 may communicate with the ambient atmosphere.

DESCRIPTION OF THE METHOD, PARTICULARLY RELATIVE TO THE EMBODIMENT OF FIGURES 1–2

The entire gas-flow system is purged of air and then filled with a suitable gas, such as xenon, nitrogen, argon, carbon dioxide, etc. Pump 47 is operated to produce a high pressure in annulus 34, for example from 200 p.s.i.g. to 300 p.s.i.g. There is then, preferably, a pressure drop during flow of the gas to chamber 31, following which the gas recirculates through the heat exchanger and pump. The gas flow in chamber 31 is vortical, as previously described.

A suitable current source 48 is then applied across the electrodes 10 and 11, by means of leads 49 and 50. An electric arc, indicated at 51, is initiated between adjacent end portions of the electrodes. The power of the arc may be very high, for example 100 or 150 kilowatts, a typical current being 500 amperes and typical voltage being 200 volts. Desirably, the current source 48 is a D.C. source which is so connected that electrode 10 is negative and electrode 11 positive.

The arc 51 is effectively constricted, centered and stabilized by the vortically-flowing gas, and extends from the apex of portion 13 of electrode 10, to the wall of the inlet portion of passage 41. The footpoint where the arc enters such wall of passage 41 is rapidly rotated by the gas, which greatly aids in cooling the electrode 11 and preventing damage thereto. Water circulating through the passages 19–20 and 27–28 cooperates with the gas in cooling the electrodes.

It has been found to be extremely difficult or impossible to maintain the gas-flow circuit completely free from particles of foreign material. Such particles, when they enter the vortex chamber 31, tend to be centrifugally thrown against the interior wall of envelope 32, and moved in rings about the axis of the chamber 31. The particles absorb large amounts of energy from the arc 51, so that they become extremely hot. Such hot particles result in heating of the envelope 32 and may in some instances, particularly at the very high power levels, results in softening thereof.

Because the pressure in chamber 34 is preferably maintained higher than that in chamber 31, even softening of the envelope 32 will not result in contact between envelope 32 and the outer envelope 33. Stated otherwise, softening of the inner envelope will cause the same to be moved inwardly by the relatively high gas pressure in the annulus 34, instead of being expanded outwardly into contact with the envelope 33. It follows that the outer envelope 33 will remain relative cool and clear. Upon failure or excessive darkening of the inner envelope 32, it may be readily replaced.

The gas which is introduced axially through parts 37 into the annulus 34 provides efficient cooling of the outer envelope 33, and also of the outer surface of the inner envelope. Since the gas does not flow vortically in the annulus 34, there is no centrifugal actuation of particles against the interior surface of the envelope 33. In cases of operation of the light source at extremely high power levels, auxiliary outlet means may be provided through the envelope 33 and connected directly to the inlet of pump 47, the result being that extremely high volumes of gas may be passed through the annulus 34 for effective cooling of the envelopes. Thus, more gas is passed through annulus 34 than through vortex chamber 31.

Another advantage of the double envelope, which is known as such to the prior art, is that the inner envelope 32 filters light and thereby tends to minimize heating and darkening the outer envelope 33. For this purpose, both envelopes are made of the same material.

The pressure differential across the vortex envelope 32 should be substantial, but not sufficient to place undue strain thereon. For example, the pressure drop from annulus 34 to vortex chamber 31 may be 50 p.s.i. It is emphasized that, because there is a pressure drop from chamber 34 to chamber 31, none of the hot gas may be convectively or otherwise circulated directly from chamber 31 to chamber 34. Because of the fact that the outer envelope 33 may be maintained cool, the entire light source may be immersed in liquid without excessive thermal shock, and as will be described subsequently.

It is another feature of the present light source that the temperature gradient immediately around the arc 51 is extremely steep. This is especially true where the rate of gas flow is high, for example much higher than 10 s.c.f.m. The rate of gas re-circulation may be on the order of 30 s.c.f.m. Particularly at such high gas-flow rates, the important transformation of energy to the newly-entering gas is radiative instead of convective or conductive. At least for various gases, for example argon, the spectral energy distribution curve of the present light source may be termed inverted in many spectral regions. Stated otherwise, in many spectral regions the shorter wave length intensities are often very much greater than the intensities of the adjacent longer wave lengths. This indicates that the incoming cool gas is subjected to a strong optical pumping action. Such pumping action creates cylindrical zones with inverted populations in the atomic quantum levels. The vacuum ultra-violet radiation absorbed by the cool gas continually populates the higher quantum levels, leaving inversions between the lower of these and the first excitation level. Therefore, some of the longer wave-length radiation leaving the arc will cause induced emission from at least some of the inverted-population shells, which emission may be employed in the manner of a laser.

Embodiment of FIGURES 3–5

In the embodiment of FIGURES 3–5, wall means 53 (which may be water cooled) are provided to define an arc chamber 54 which is ellipsoidal in nature. More specifically, a portion 53a of the wall means has a highly reflective interior surface 55 which is a surface of revolution formed by rotating a major portion of an ellipse about a predetermined axis, the axis being horizontal in the present illustration. Such ellipse has a first focal point indicated at 56, and a second focal point indicated at 57 and which is outside of the arc chamber 54.

A second part 53b of the wall means 53 has an interior surface 58 which is a surface of revolution about the same axis and may be conical, spheroidal, etc. The wall means 53a and 53b are sealingly connected to each other in such manner that the surfaces 55 and 58 merge.

First and second electrodes 60 and 61 are mounted in wall means 53 and extend into chamber 54, the arcing portions of the electrodes being disposed on opposite sides of the first focal point 56 and in alignment therewith. At least one of the electrodes, indicated as number 61, has an outlet passage 62 through which gas discharges from the arc chamber 54. In the present illustration, the common axis of the electrodes 60 and 61 is perpendicular to the axis of chamber 54. Suitable conduit and chamber means are provided to effect cooling of the electrodes.

Gas is introduced into chamber 54 from a first gas source 63 and associated conduit 64. The portion of conduit 64 which is adjacent the chamber is tangential (FIGURE 4) to an imaginary circle having focal point 56 as its center and lying in a plane perpendicular to the common axis of electrodes 60 and 61. Thus, gas which is introduced into the chamber tends to whirl therein.

The portion 53b of wall means 53 has a port 66 therein and concentric with the axis of chamber 54. An outer or pressure window 67 is mounted across the port, and an inner window 68 is mounted at the interior portion of the port by suitable means, not shown. The relationship is such that a chamber 69 is defined between the windows, into which gas is introduced from a source 71 through conduit means 72.

Port 69 is sufficiently large that the radiant energy from the arc may be focused at the second focal point 57. On the other hand, the port is sufficiently small that the windows 67 and 68 will withstand high pressures.

As shown in FIGURE 5, a port or passage 73 is provided through a rim portion of the inner window 68. Such passage enters the arc chamber 54 in such a direction as to augment the previously-indicated whirling flow of gas therein. Thus, the port or passage 73 is also generally tangential to an imaginary circle having focus 56 as its center and disposed in a plane perpendicular to the common axis of the electrodes.

The relationship between conduit means 64 and 72, port 73, outlet 62, etc., is such that the gas pressure in the chamber 69 is higher than that in the arc chamber 54, for reasons indicated relative to the previous embodiment.

A suitable target to be irradiated may be disposed at the second focal point 57. Alternatively, a conduit or pipe 74 having a highly reflective internal surface 75 may be mounted on the wall means 53b coaxially of the chamber 54. Such pipe reflects the light to a suitable target such as the one indicated at 76.

In performing the method of the embodiment of FIGURES 3–5, gas is introduced into the arc chamber 54 from the gas sources 63 and 71, the gas from source 71 passing through the chamber 69 between the outer and inner windows 67 and 68. The resulting whirling flow of gas in chamber 54 provides a beneficial effect relative to the high-power arc which is struck, through the first focal point 56, between the tip of electrode 60 and the interior wall of nozzle passage 62. The arc is supplied with power through leads 49 and 50 from the source 48 which is indicated in FIGURE 1. Suitable insulators, not shown, are provided to prevent shorting of the current through wall means 53a.

Because of the characteristics of the elliptical wall section 55, an image of the arc is reproduced in the region of the second focal point 57, outside of both chambers 54 and 69. It follows that a very intense light is present at the second focal region 57. Such light may be utilized for various purposes at the region 57 or may be transmitted through the pipe 74 to the target indicated at 76. The double window 67–68 produces effects related to those described relative to the embodiment of FIGURES 1–2. Thus, the inner window 68 prevents contaminants from engaging outer window 67, and the excess pressure within chamber 69 prevents the inner window from touching the outer window despite any softening of the former.

It is to be understood that the gas sources 63 and 71 may be combined, that re-circulation and heat exchange means may be employed, etc. The types of gases, gas pressures, gas flow rates, power levels, etc., may be generally the same as discussed relative to the preceding embodiment.

Embodiment of FIGURE 6

As previously indicated, the light source shown in FIGURES 1 and 2 may be submerged in liquid if desired. FIGURE 6 illustrates an embodiment wherein liquid is circulated over the outer envelope 33a in order to filter the light emanating from the arc. Liquid may also be circulated for other purposes, including irradiation of the liquid, achievement of photochemical effects, creation of a liquid laser, and cooling of the window.

In the illustrated form, the outer envelope 33a is made integral with, or otherwise suitably associated with, a third tube or envelope 81 also formed of fused silica, quartz, etc. Such third envelope is concentric and coaxial with the previously-described pressure envelope and vortex envelope 33a and 32. Suitable header chambers 82 and 83 may be defined at opposite ends of the annulus 84 which is formed between the envelopes 81 and 33a. A suitable liquid source 86 may be associated with one header chamber 82, whereas a suitable liquid discharge or drain 87 may be associated with the other header chamber 83. A means may be provided to recirculate liquid between the drain 87 and the source 86.

With the described apparatus and method, various undesired wave lengths may be filtered out of the light emanating from the source. Thus, with an argon arc, a copper sulfate solution will cut off the red and infra-red and pass the blue, violet and near ultra-violet.

It is to be understood that the fluid passed through the annulus 84 may be a gas or vapor instead of a liquid.

Embodiment of FIGURE 7

In the embodiment of FIGURE 7, the same light source shown and described relative to FIGURES 3–5 is mounted adjacent and sealingly associated with a port 91 in one side wall of a tank 92 containing a suitable fluid 93, either liquid or gas. Thus, the second focal point 57 is disposed in the fluid 93 so that the concentrated light creates a very intense photochemical effect relative thereto.

The liquid or gas may be suitably circulated through the tank 92, if desired. A viewing or light-transmission window 94 may be provided opposite the window 67.

Embodiment of FIGURES 8 and 9

Referring next to FIGURES 8 and 9, an ellipsoidal-type light source is illustrated wherein the electrodes are oriented along the axis of the ellipsoidal chamber. Wall means 96 are provided with an internal reflective surface 97 which is a surface of revolution formed by rotating a major portion of an ellipse about a predetermined axis. The two focal points of the ellipse are indicated at 98 and 99.

A first electrode 101 is mounted in the wall means 96 along the axis of the arc chamber 102 defined by surface 97. Such first electrode has a longitudinal gas-discharge passage 103 therethrough. Disposed on the opposite side of the first focal point 98, and also along the axis of the chamber 102, is a second electrode 104. Such second electrode is mounted by means of a single hollow support leg 106 which projects obliquely through the wall means 96. Suitable means are provided to water cool the electrodes and to supply electrical power thereto, as described previously relative to other embodiments of the invention. Suitable means are provided to insulate at least one electrode from wall 96.

Gas is introduced tangentially into the chamber 102 from a first gas source 107 through conduit means 108. The portion of conduit means 108 adjacent the chamber 102 is a passage tangential to wall 97, lying in a plane perpendicular to the common axis of the electrodes 101 and 104. Thus, gas introduced through the passage 108 whirls about the arc struck between the electrodes and then passes through the outlet passage 103.

A portion of the ellipse, to the right as viewed in FIGURE 8, is truncated by a wall 109 which has a central port 110 therein, the port being coaxial with the chamber 102. A pressure window 111 is mounted in the port, and a relatively large-diameter inner window 112 having a rim 113 is mounted within chamber 102 by suitable means, not shown.

A second gas source 114 is connected through a conduit 115 to the chamber 116 defined between the outer and inner windows 111 and 112. From the chamber 116, gas flows through a passage 117 (FIGURE 9) which extends through the rim 113 generally tangentially to chamber 102. The direction of flow of gas through the passage 117 is such as to augment the whirling flow of gas caused by introduction thereof through passage 108. As in the previous embodiments, the various size and pressure relationships are preferably such that the pressure in chamber 116 is higher than that within chamber 102.

In practicing the method of the embodiment of FIGURES 8–9, gas is introduced from the sources 107 and 114 and whirls about the axis of chamber 102. Power is applied to the electrodes 101 and 104 as described relative to previous embodiments, so that an arc extends along the axis of chamber 102 and into the discharge passage 103. The light thus generated at the first focal point 98 is reflected by the mirror surface 97 to the second focal point 99 which is outside of both chambers 102 and 116.

It is to be understood that the present light source may be associated with a tank, with a pipe, etc., as described relative to the embodiment of FIGURES 3–5 and 7. It is also to be understood that the gas sources 107 and 114 may be combined, and that the various gases, powers, flow rates, etc., may be on the order of those previously described.

Relative to the embodiment of FIGURES 3–5 and 8–9, the elliptical wall means may in some instances be replaced by other shapes. For example, where parallel rays are desired the wall may be parabolic.

The foregoing detailed description is to be clearly understood as given by way of illustration and example only, the spirit and scope of this invention being limited solely by the appended claims.

I claim:
1. A light source, which comprises:
   first wall means to define a discharge chamber,
      at least a portion of said first wall means being transparent,
   second wall means having a transparent portion so related to said transparent portion of said first wall means that light from said discharge chamber may pass in series through said transparent portions,
      said first and second wall means cooperating with each other to define a second chamber external to said discharge chamber,
         both of said transparent portions forming part of the walls of said second chamber,
   electrode means having arcing portions disposed to effect at least a major portion of an electrical discharge in said discharge chamber,
   means to effect a high-current electrical discharge in said discharge chamber between said arcing portions of said electrode means, and
   pump means to effect continuous introduction of high-pressure gas into said discharge chamber and continuous draining of gas therefrom,
      said pump means including means to effect continuous forced recirculation of gas from said discharge chamber and gas from said second chamber to and through regions exterior to both said discharge chamber and said second chamber.
2. A light source, which comprises:
   first wall means to define an arc chamber,
      at least a portion of said first wall means being transparent,
   second wall means cooperating with said transparent portion of said first wall means in defining a second chamber,
      said second wall means having a transparent portion spaced from said transparent portion of said first wall means and so related thereto that light from said arc chamber may pass in series through said transparent portions,
   electrode means having arcing portions disposed to maintain at least a major portion of an arc in said arc chamber,
   means to maintain a high-current electric arc in said arc chamber between said arcing portions of said electrode means,
   means to effect continuous introduction of high-pressure gas into said second chamber,
   means to effect flow of at least part of said gas from said second chamber into said arc chamber, and
   means to effect discharge of said gas from said arc chamber independently of said second chamber.
3. The invention as claimed in claim 2, in which means are provided to maintain the gas pressure in said second chamber substantially higher than that in said arc chamber.
4. A light source, which comprises:
   first wall means to define a discharge chamber,
      at least a portion of said first wall means being transparent,
   second wall means having a transparent portion disposed outwardly of and registered with said transparent portion of said first wall means whereby light from said discharge chamber may pass in series through said transparent portions,
      said transparent portions being spaced from each other to define a space therebetween,
   electrode means having arcing portions disposed to maintain at least a major portion of an electrical discharge in said discharge chamber,
   means to effect a high-current electrical discharge in said discharge chamber between said arcing portions of said electrode means, and
   pump means to effect continuous introduction of high-pressure gas into said discharge chamber in such manner that gas flows vortically therein, whereby centrifugal force tends to maintain impurities in contact with said transparent portion of said first wall means,
      said pump means also effecting continuous draining of gas from said discharge chamber,
      said pump means including means to effect con- tinuous forced circulation of gas from said discharge chamber and gas from said space to a region exterior to both said discharge chamber and said space.

5. The invention as claimed in claim 4, in which means are provided to maintain the gas pressure in said space substantially higher than the gas pressure in at least the portions of said discharge chamber which are adjacent said transparent portion of said first wall means.

6. A light source, which comprises:
first wall means to define an arc chamber,
at least a portion of said first wall means being transparent,
second wall means cooperating with said transparent portion of said first wall means in defining a second chamber,
said second wall means having a transparent portion spaced from and registered with said transparent portion of said first wall means whereby light from said arc chamber may pass in series through said transparent portions,
electrode means having arcing portions disposed along a predetermined axis to maintain at least a major portion of an arc in said arc chamber,
means to maintain a high-current electric arc in said arc chamber between said arcing portions of said electrode means,
means to effect continuous introduction of high-pressure gas into said second chamber,
means to effect flow of at least part of said gas from said second chamber into said arc chamber and in such manner that said gas flows vortically in said arc chamber about said predetermined axis, and
means to effect draining of gas from said arc chamber through at least one of said arcing portions and independently of said second chamber.

7. A method of generating high-intensity light, which comprises:
defining an arc chamber having a light-transmissive wall portion,
providing a light-transmissive window member in registry with said light-transmissive wall portion and spaced therefrom,
maintaining in said arc chamber opposite said window member and opposite said light-transmissive wall portion at least a portion of a high-current electric arc,
transmitting light from said arc in series through said light-transmissive wall portion and through said window member,
continuously introducing high-pressure gas into said arc chamber,
continuously discharging gas from said arc chamber,
preventing hot gas from passing from the region of said arc to the space between said light-transmissive wall portion and said window member,
continously introducing gas into said space and draining said gas therefrom, and
continuously recirculating gas from said arc chamber to and through regions exterior to both said arc chamber and said space.

8. A method of generating high-intensity light, which comprises:
defining a discharge chamber the wall of which has a first window therein,
disposing a second window outside of said discharge chamber and spaced from said first window,
defining a second chamber having both of said windows as wall portions thereof,
continuously introducing gas into said second chamber,
continuously passing gas from said second chamber into said discharge chamber,
continuously draining gas from said discharge chamber through a path independent of said second chamber,
creating in said discharge chamber at least a major portion of a high-current electrical discharge, and
transmitting light from said discharge through both of said windows to a point of use.

9. The invention as claimed in claim 8, in which said method further comprises maintaining the gas pressure in said second chamber substantially higher than that in said discharge chamber.

10. Apparatus for generating light, which comprises:
a first tubular element composed of transparent material and forming a vortex envelope,
a second tubular element coaxial with said first envelope and also composed of transparent material, said second tubular element having a diameter substantially larger than that of said first tubular element and forming a pressure envelope,
means to close the ends of the annulus between said envelopes,
first and second metal electrodes introduced into opposite ends of said vortex envelope and having arcing portions disposed at the axis thereof,
at least one of said electrodes having an outlet opening therein along said axis,
means to close the ends of said vortex envelope to define a closed vortex chamber in which said arcing portions of said electrodes are disposed,
means to maintain a high-current electric arc between said arcing portions of said electrodes and in said vortex chamber,
means to pass high-pressure gas continuously into said annulus for flow therein, and
means to pass gas from said annulus into said vortex chamber for vortical flow therein about said aixs and subsequent discharge through outlet means including said outlet opening in said one electrode.

11. The invention as claimed in claim 10, in which said last-named means comprises passage means disposed at at least one end of said vortex chamber, said passage means communicating tangentially with said vortex chamber.

No references cited.

S. D. SCHLOSSER, *Primary Examiner.*

JAMES W. LAWRENCE, *Examiner.*